United States Patent [19]
Freeman et al.

Patent Number: 5,524,377
Date of Patent: Jun. 11, 1996

[54] SYNTHETIC JIG TRAILER FISHING LURE

[75] Inventors: Lynn Freeman, Southaven; Lyndall Helms, Horn Lake, both of Miss.

[73] Assignee: Lyndall L. Helms, Byhalia, Miss.

[21] Appl. No.: 267,469

[22] Filed: Jun. 28, 1994

[51] Int. Cl.⁶ .................................................. A01K 85/00
[52] U.S. Cl. ......................... 43/42.06; 43/42.3; 43/42.31
[58] Field of Search ............................... 43/42.06, 42.28, 43/42.29, 42.3, 42.31

[56] References Cited

U.S. PATENT DOCUMENTS

| | | | |
|---|---|---|---|
| 2,516,399 | 7/1950 | Lovelace | 43/42.29 |
| 3,964,203 | 6/1976 | Williams | 43/42.06 |
| 4,074,455 | 2/1978 | Williams | 43/42.06 |
| 4,530,179 | 7/1985 | Larew . | |
| 4,875,305 | 10/1989 | Bridges | 43/42.06 |
| 4,953,319 | 9/1990 | Kasper | 43/42.06 |
| 4,993,183 | 2/1991 | Carver | 43/42.06 |
| 5,007,194 | 4/1991 | Coody . | |
| 5,276,993 | 1/1994 | Rosenblatt | 43/42.06 |

OTHER PUBLICATIONS

Fred Arbogast Company, Inc., 1993–1994 product catalogue, pp. 26 and 27 Uncle Josh Bait Company advertisement flyer for "Glitter Porker".
Uncle Josh Bait Company fishing lure catalogue entitled "One of a Kind Pork Rind". 1991 Uncle Josh Bait Company.

*Primary Examiner*—Richard K. Seidel
*Assistant Examiner*—James Miner
*Attorney, Agent, or Firm*—Baker, Donelson, Bearman & Caldwell

[57] ABSTRACT

A jig trailer fishing lure made of a synthetic material capable of absorbing water and fish attractant liquids. The lure is capable of completely drying out between uses yet quickly re-acquires a life-like texture, suppleness and buoyancy when immersed in water. The jig trailer includes a head portion that is sufficiently tear resistant to resist tearing when repeatedly penetrated by a fish hook or struck by fish. A tail portion extends downstream from the head portion and exhibits motions that attracts game fish when pulled through water. The synthetic material is an artificial chamois-type material preferably made from a poly-vinyl-alcohol sponge.

10 Claims, 2 Drawing Sheets

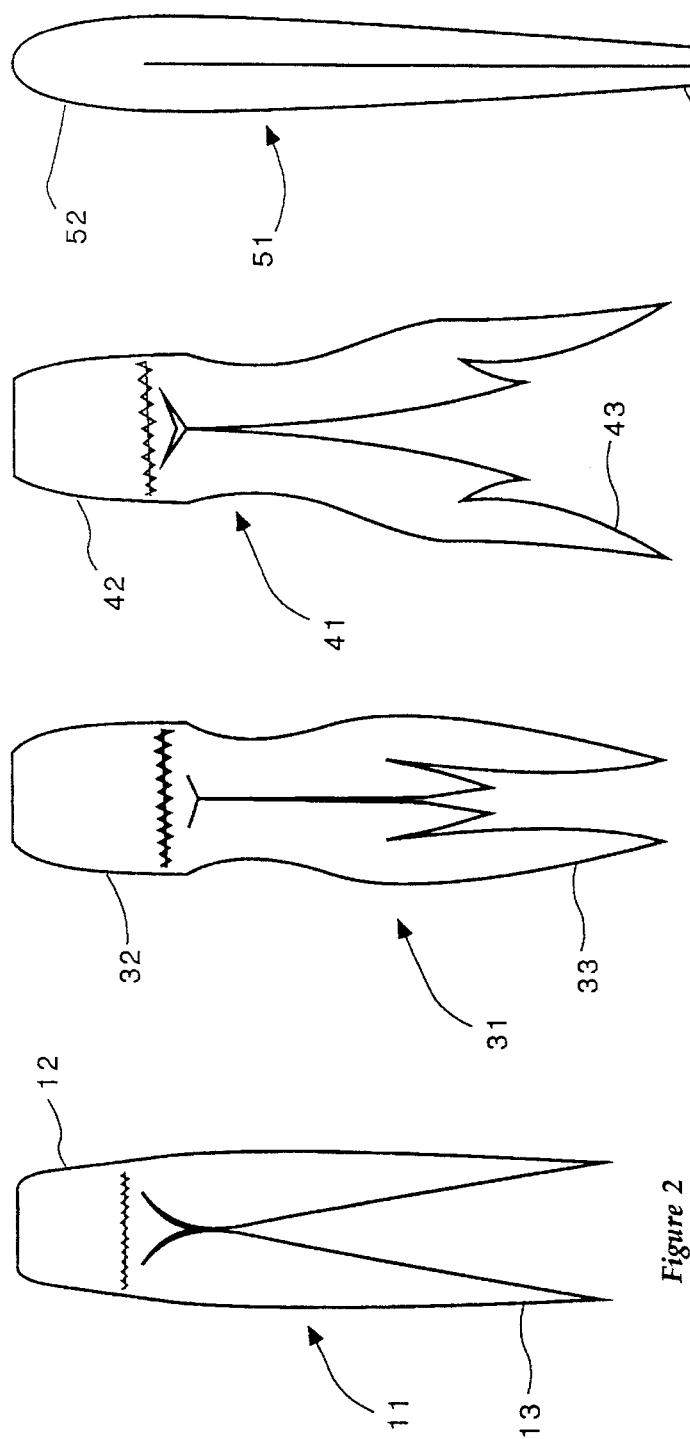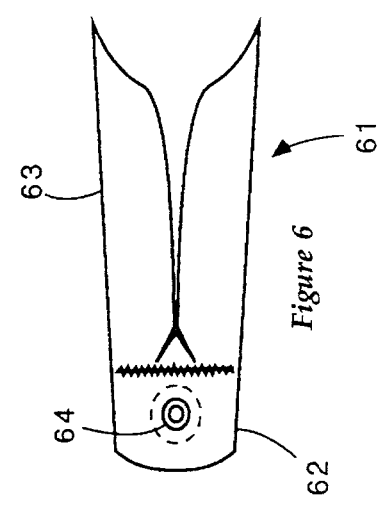

SYNTHETIC JIG TRAILER FISHING LURE

BACKGROUND OF THE INVENTION

The present invention relates generally to artificial fishing lures, and in particular to a synthetic jig trailer fishing lure that exhibits life-like suppleness, texture and buoyancy when immersed in water.

One general class of fishing lures are commonly referred to as "jig trailers." Although variations exist, these lures typically include a head portion that receives the fishing hook and an elongated trailing portion that extends from the head portion. Historically, jig trailers have been manufactured from treated animal hides, since no other known materials had the strength of animal hide while retaining life-like suppleness, texture and buoyancy in water. Jig trailers are generally not used alone; instead they are typically attached to the hook of a rubber legged or hair skirted jig (a hook molded into a lead head). When in use, a jig trailer enhances the life-like look and feel of a bare jig.

At the present time, the oldest and largest selling product in this fishing lure class is referred to as "Uncle Josh", which essentially consists of a pork hide lure that must be sealed in a preservative and kept from contact with the air until use. These type of animal hide fishing lures are typically manufactured from organic pig hide that is comprised of a layer of skin with a portion of fatty tissue. This type of organic matter obviously deteriorates with exposure to heat, light and air. Therefore, such an animal hide must be preserved during manufacturing, distribution, and even during fishing since it will dry out and become unusable within minutes if not kept in an aqueous solution. The lures are sold in a preservative solution that, is messy, greasy and extremely difficult to reuse. Some versions are sold in small jars that are sealed to prevent leakage, since any leakage of the special preservative solution causes the container top to seize making it extremely difficult to open or reopen.

While animal hide lures exhibit desirable life-like action when fresh, age deteriorates the lure causing odor, discoloration, and the formation of grease from rotting flesh on the surface of the lure. Thus, even if the fisherman is successful in preventing the lure from drying out, it will eventually become rotted and unusable. These products are also have the drawback of being substantially unable to absorb water or fish attractant liquids since the animal hide has little absorbent properties and is saturated with the preservative solution when sold. Finally, animal hide is very tough, and manufacturing often requires a punched hole so that the fisherman can penetrate the thick layer of fat and skin with a fishing hook. Once in place on a jig, removal of the fishing hook due to its barb is extremely difficult, and often cannot be accomplished without destroying the lure.

Another type of animal hide jig trailer is manufactured from treated sheep skin in accordance with U.S. Pat. No. 5,007,194 to Coody. These lures are made from domestic animal skin using a special treating process that allows the skin tissue to absorb water and become thick and meaty. While these specially treated animal hides appear to last significantly longer than the Uncle Josh baits, they do so only by sacrificing performance. In any event, these hide jig trailers still deteriorate over time and retain the hook penetration difficulties of all animal hide lures.

Relatively recently, molded plastic jig trailers have appeared on the market in the same basic shape as the long available animal hide lures. These jig trailers are made from the same molded plastic material as artificial worms. While these artificial jig trailers provide action similar to animal hide designs, they lack absorbency sufficient to carry a fish attractant scent, and the weakness of the material quickly causes it to deteriorate and shred apart from any concentrated stress, such as that caused by a fish strike or the localized stress caused by a fish hook. Once destroyed during fishing, these artificial jig trailers must be discarded.

What is needed is a jig trailer that is easily manufactured; that does not require special packaging or preservatives during manufacturing, distribution or use; that is resilient and reusable and capable of being dyed in many colors and cut into many shapes; and, exhibits a life-like look and feel, without the between use problems encountered in jig trailer fishing lures of the prior art.

SUMMARY OF THE INVENTION

In response to this need, the present invention provides a jig trailer fishing lure comprising a head portion of a size suitable for being penetrated by a fishing hook and a trailing portion attached to and extending away from the head portion. The trailing portion is made from a synthetic material sufficiently absorbent to absorb fish attractant liquids and water, and sufficiently tear resistant to survive fish strikes and repeated penetration by a fish hook without significant damage. The synthetic material has an appropriate texture and is sufficiently supple and buoyant when immersed in water to appear life-like to game fish. Finally, the synthetic material is capable of drying out between uses, yet quickly re-acquires its life-like suppleness and buoyancy when re-immersed in water. In one specific embodiment, the jig trailer fishing lure is cut from continuous pieces of artificial chamois-type material made from a poly-vinyl-alcohol sponge.

BRIEF DESCRIPTION OF THE DRAWINGS

FIG. 2 is a top plan view of the synthetic jig trailer fishing lure shown in FIG. 1.

FIGS. 3–7 are top plan views showing a variety of example jig trailer fishing lure shapes.

DETAILED DESCRIPTION OF THE PREFERRED EMBODIMENTS

Figure 1:
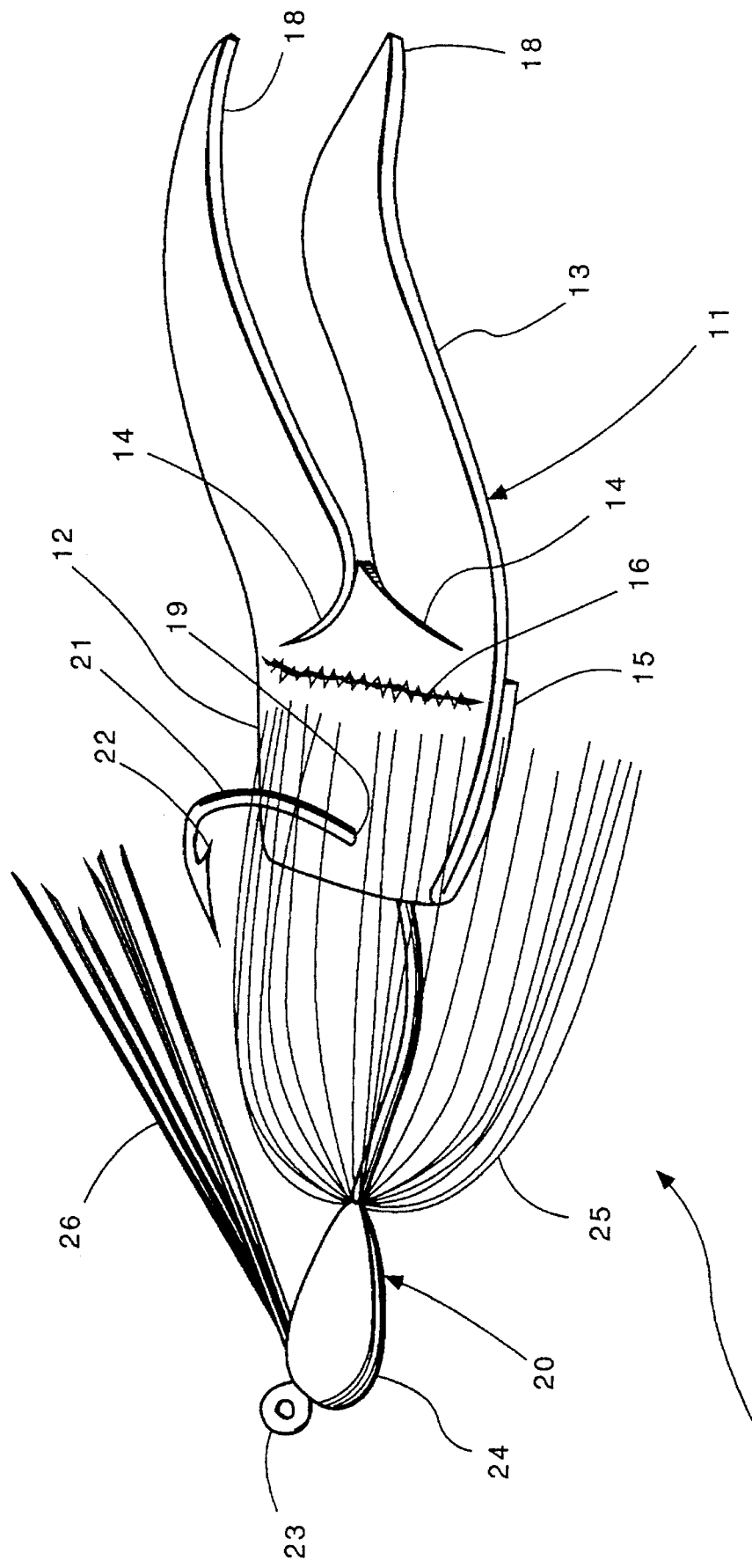
FIG. 1 is a perspective view of a fishing lure that includes a hair or rubber skirted jig and a jig trailer fishing lure according to one embodiment of the present invention.

Referring now to FIG. 1, an artificial fishing lure 10 includes a synthetic jig trailer fishing lure 11 according to one embodiment of the present invention attached to an ordinary hair or rubber skirted jig 20. Jig trailer 11 includes a head portion 12 and an elongated trailing portion 13 attached to and generally extending downstream from the head portion. Jig trailer 11 is cut from a continuous piece of synthetic material in such a shape and size that head portion 12 includes a flap 15 folded back upon itself and sewn along line 16 so that the head portion includes at least two layers of synthetic material. Trailing portion 13 is cut to include a pair of relatively slender leg imitating extensions 18 that wiggle in a wave like fashion that tends to attract game fish. Trailing portion 13 also includes a pair of cuts 14 which further allow extensions 18 to twist and move in a life-like manner, even when the fishing lure is at rest.

Jig trailer fishing lure 11 is attached to a hair or rubber skirted jig 20 by being penetrated at location 19 by fishing hook 21. It has been found that, unlike animal hide lures of the prior art, hook 21 can be removed from head portion 12 and reinserted many times without destroying the integrity of the head portion despite the presence of barb 22 on the fish hook. Furthermore, head portion 12 resists tearing even when repeatedly struck by fish or dragged through relatively heavy fish habitat. Thus, the present invention allows the fisherman to attach, try and remove several different shapes, colors and sizes of jig trailers without risking damage to the individual trailers.

For illustration purposes only, jig trailer fishing lure 11 is shown in use with an ordinary hair or rubber legged skirted jig 20 that includes a hook 21 with an eye 23. A normally painted lead head 24 surrounds the upper portion of the hook. Brush guard 26 and skirt 25 are attached to and extend away from lead head 24. It should be understood that the jig trailer, according to the present invention, can be used to enhance the performance of a myriad of different jig designs, apart from the skirted jig shown in FIG. 1. For example, the present invention has been successfully used to enhance the following different jig types: Stanley, Lunker Lure and Strike King, as well as a variety of spinner baits and buzz baits.

Jig trailers, according to the present invention, are preferably cut from continuous pieces of artificial chamois-type material that is capable of completely drying out, yet quickly resuming a life-like texture, suppleness and buoyancy when re-immersed in water. Such a material is commercially available from EMGEE Marketing of Chicago, Ill. under the product name "The Absorber". This artificial chamois-type material is known in industry as a poly-vinyl-alcohol sponge that is a hydrophilic plastic made using a special pore-making process. The resulting material has a minute reticulated structure of continuous pores in a uniform labyrinth. It is particularly well suited to the present invention since it can be readily dyed in multiple colors and patterns while retaining the ability to readily absorb virtually any fish attractant fluids. Poly-vinyl-alcohol sponge is also the preferred material because it can be manufactured, distributed and sold in a dry or semi-dry condition, thus greatly reducing the expensive and time consuming treatment process and packaging problems associated with natural animal hide lures. Finally, lures made using a poly-vinyl-alcohol sponge can go through many cycles of drying out and becoming wet again without any deteriorating affects on the texture, suppleness and natural buoyancy of the lure.

FIGS. 2–5 show a small example of the variety of shapes in which the jig trailer fishing lure of the present invention can be made. FIG. 2 shows the jig trailer 11 of FIG. 1 when separated from the underlying skirted jig 20. FIG. 3 shows a crawfish jig trailer 31 having a two layered head portion 32, similar to jig trailer 11, and a trailing portion 33 that is suppose to simulate the backward swimming action of a crawfish when in use. FIG. 4 shows a fighting crawfish jig trailer 41 having a head portion 42 similar to the earlier embodiments and a trailing portion 43 set in a shape to simulate a fighting crawfish when in use. FIG. 5 shows a spinner bait trailer 51 having a single layer head portion 52 and a pair of elongated thin extensions constituting trailing portion 53.

FIG. 6 shows a jig trailer 61 in a frog imitating shape that has proved to be the most common and successful design discovered by the inventors to date, and like earlier embodiments, includes a head portion 62 and a tail portion 63. An enhancement to any of the basic designs could include the insertion of a rattling device, commonly called a worm rattler, in the pouch created by the folded flap sewn at 16. For instance, a rattle 64 is embedded in the head 62 of frog shaped jig trailer 61. FIG. 7 shows still another jig trailer 71 in a pork frog shape having a head portion 72 and a tail trailing portion 73. It being understood that FIGS. 2–7 represent only a small fraction of the potential different shapes and sizes in accordance with the present invention.

It should be clear to one skilled in the art that the preferred embodiments have been described for illustration purposes only and that many apparently different embodiments can be made. For instance, other synthetic materials having properties similar to the poly-vinyl-alcohol sponge described above could be utilized. The above description should serve to aid in an understanding of the invention and is not intended to limit in any way the legal scope of the patented invention, which is defined solely in terms of the claims as set forth below.

We claim:

1. A jig trailer fishing lure comprising:

a head portion of a size suitable for being penetrated by a fishing hook and a trailing portion with a particular shape having a pair of leg imitating extensions attached to and extending away from said head portion and a pair of cuts defined in said extensions wherein said extensions exhibit wave-like and twisting motions when immersed in water that are attractive to game fish;

said head portion and said trailing portion being made from a poly-vinyl-alcohol sponge material so as to have a texture that is sufficiently absorbent to absorb fish attractant liquids and water, supple and buoyant when immersed in water, and sufficiently tear resistant to resist tearing when repeatedly struck by said game fish or repeatedly penetrated by said hook;

said head portion and said trailing portion being further capable of drying out between uses yet quickly re-acquiring said texture, suppleness and buoyancy when re-immersed in water.

2. The jig trailer fishing lure of claim 1, wherein said head portion and said trailing portion are cut out of a relatively thin continuous piece of said poly-vinyl-alcohol sponge material.

3. The jig trailer fishing lure of claim 2, wherein said particular shape is symmetric about an axis of symmetry.

4. The jig trailer fishing lure of claim 3, wherein said particular shape is a crawfish imitating shape.

5. The jig trailer fishing lure of claim 3, wherein said particular shape is a fighting claw imitating shape.

6. The jig trailer fishing lure of claim 3, wherein said particular shape is a spinner bait trailer shape.

7. The jig trailer fishing lure of claim 3, wherein said particular shape is a frog imitating shape.

8. The jig trailer fishing lure of claim 3, wherein said particular shape is a pork frog shape.

9. The jig trailer fishing lure of claim 2, wherein said head portion includes a portion of said poly-vinyl-alcohol sponge material folded back upon itself and sewn together such that said head portion includes at least two layers of said poly-vinyl-alcohol sponge material.

10. A jig trailer fishing lure comprising:

a head portion of a size suitable for being penetrated by a fishing hook and a trailing portion with a particular shape symmetrical about an axis of symmetry attached to and extending away from said head portion;

said head portion and said trailing portion being made from a relatively thin continuous piece of poly-vinyl-alcohol sponge material so as to have a texture that is sufficiently absorbent to absorb fish attractant liquids and water, supple and buoyant when immersed in water, and sufficiently tear resistant to resist tearing when repeatedly struck by fish or repeatedly penetrated by a hook;

said head portion further having a portion of said poly-vinyl-alcohol sponge material folded back upon itself and sewn together such that said head portion includes at least two layers of said poly-vinyl-alcohol sponge material;

said head portion and said trailing portion being capable of drying out between uses yet quickly re-acquiring said texture, suppleness and buoyancy when re-immersed in water; and a rattling device attached between said two layers of said poly-vinyl-alcohol sponge material.

\* \* \* \* \*